(Specimens.)

J. WEBB.
MANUFACTURE OF FANCY GLASSWARE.

No. 345,265. Patented July 6, 1886.

Witnesses.
A. A. Moore.
A. N. Connolly

Joseph Webb
Inventor
By Connolly Bros.
Atty's

United States Patent Office.

JOSEPH WEBB, OF BEAVER, PENNSYLVANIA.

MANUFACTURE OF FANCY GLASSWARE.

SPECIFICATION forming part of Letters Patent No. 345,265, dated July 6, 1886.

Application filed December 2, 1885. Serial No. 184,478. (Specimens.)

*To all whom it may concern:*

Be it known that I, JOSEPH WEBB, a subject of the Queen of Great Britain, residing at Beaver, in the county of Beaver and State of Pennsylvania, have invented certain new and useful Improvements in the Manufacture of Fancy Glassware; and I do hereby declare the following to be a full, clear, and exact description of the invention, reference being had to the accompanying drawings, which form part of this specification.

This invention has relation to a method of manufacturing fancy glass, and has for its object the provision of a method of manufacturing fancy glassware or articles or pieces of glass heretofore unknown.

This invention consists in the production of glass articles by first forming a body, section, cylinder, or other form of opaque glass with indentations, cavities, or depressions in its surface, and, while the indented opaque glass is still warm, placing upon its indented surface a film, sheet, or coating of transparent glass in a heated condition, and then pressing the transparent film into contact with the opaque glass, so as to incorporate it therewith, thereby confining the air within the indentations or cavities in the opaque glass in order to produce the desired effect.

Figure 1:
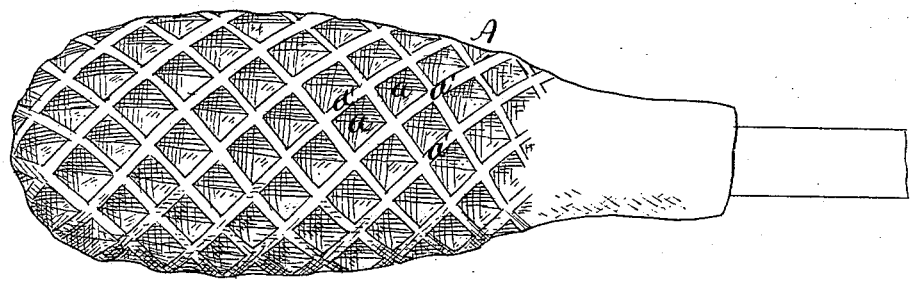
Figure 2:
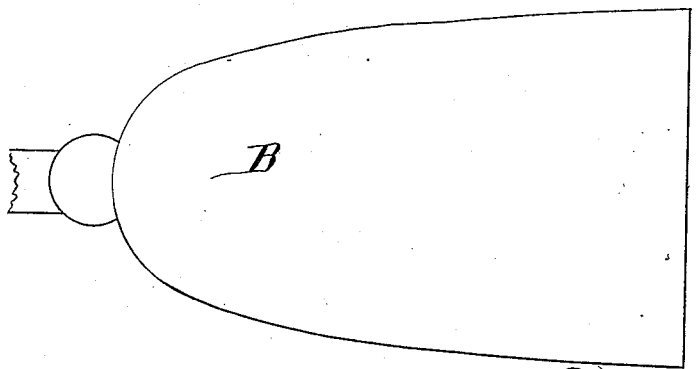
Figure 3:
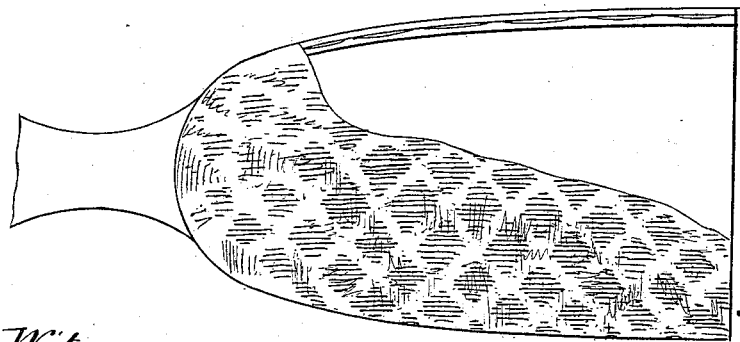

In the accompanying drawings, in Figure 1 is shown the section, body, or piece of opaque glass in the condition in which it appears before the attachment of the transparent coating or film. In Fig. 2 is shown the transparent film ready for application to the opaque section, and in Fig. 3 a sectional view of the opaque section and the transparent film together.

A designates the opaque body or section having upon its surface indentations, cavities, or recesses *a a a*, bounded by ribs or ridges *a' a' a'*. The opaque section or body A may be produced by any of the well-known processes of manufacturing glass; but the preferable form or manner of making it is to blow it in a suitable mold, having elevations upon its surface adapted to form the indentations, recesses, or cavities on the surface of the opaque section; but these indentations, recesses, or cavities may be produced by what is termed in the art as "crackling" the surface of the opaque glass.

In the drawings the opaque body or section A is shown as being of the ordinary pear-shaped form which a mass of blown glass first assumes. B designates a transparent film or surface, which is to be applied to the opaque section A. Said film is of a cup shape, and I also prefer to form it by the ordinary and well-known process of blowing. After the opaque section A and the transparent section B have been formed, as shown, and when the opaque section has been allowed to cool to such a degree that it will retain its shape, and while the transparent cup B is still hot enough to adhere thereto, the opaque section is inserted into the transparent cup, and the mass is then rolled upon a marver or other flat surface. The transparent film now adheres firmly to the raised portions of the opaque section, thereby confining the air in the recesses or indentations *a a a*. The article so formed is now one integral mass of glass, having bubbles of air between its opaque and its transparent walls, and may now be reheated and fashioned into any desired article—such as a tumbler, pitcher, globe, shade, &c. When the article is finished as described, the light being refracted by the globules or bubbles of air in the cavities or indentations in the opaque glass will be decomposed and reflected back in the iridal colors, thereby producing the strikingly beautiful effect desired.

It is obvious that the method above described may be varied in many particulars without departing from the spirit of the invention. For instance, the transparent film may be placed on the interior of the opaque body, instead of upon the outside of the same, in which case, of course, the indentations or cavities will be formed upon the interior surface of the opaque section. Again, the indentations or cavities may be formed upon the transparent film, while the opaque section is made perfectly plain.

I am aware that is not new to produce articles of glassware composed of two films of glass with intervening air-spaces by placing in the mold canes or strips of glass and welding them to the inner and outer cups; hence I do not claim, broadly, as my invention the manufacture of glassware of this description or character.

Having described my invention, I claim—

1. The method of manufacturing glass articles, which consists in forming a section of glass with indentations or cavities upon its surface, leaving raised portions between, then placing a coating of glass upon the indented surface and causing it to adhere by means of heat, whereby an article is produced consisting of two layers of glass having air globules between them, substantially as described.

2. The method of manufacturing articles of glass, consisting in forming a section of opaque glass with indentations or cavities on its surface, leaving raised portions between, then, while the opaque glass is still hot, placing a coating of transparent glass upon the indented surface and causing it to adhere by heat, and finally fashioning the mass so formed into the desired shape, substantially as described.

In testimony that I claim the foregoing I have hereunto set my hand this 27th day of November, 1885.

JOSEPH WEBB.

Witnesses:
EDWARD KAYE,
AND. HOWARD.